(No Model.) 10 Sheets—Sheet 1.

J. A. GROEBLI.
EMBROIDERING MACHINE.

No. 328,935. Patented Oct. 27, 1885.

Witnesses:
John C. Tunbridge.
John M. Speer.

Inventor:
Joseph A. Groebli
by his attorneys
Briesen & Steele (No Model.)　　　　　　　　　　　　　　　　　　10 Sheets—Sheet 2.
J. A. GROEBLI.
EMBROIDERING MACHINE.

No. 328,935.　　　　　　　　　　　　Patented Oct. 27, 1885.

(No Model.)

J. A. GROEBLI.
EMBROIDERING MACHINE.

No. 328,935. Patented Oct. 27, 1885.

Fig. 3

Witnesses:
John C. Tunbridge
John M. Speer

Inventor:
Joseph A. Groebli
by his attorneys
Briesen & Steele

(No Model.)　　　　　　　　　　　　　　　　10 Sheets—Sheet 8.
J. A. GROEBLI.
EMBROIDERING MACHINE.

No. 328,935.　　　　　　　　　　Patented Oct. 27, 1885.

(No Model.) 10 Sheets—Sheet 9.
J. A. GROEBLI.
EMBROIDERING MACHINE.

No. 328,935. Patented Oct. 27, 1885.

Witnesses:
John C. Tunbridge,
John M. Speer,

Inventor:
Joseph A. Groebli
by his attorneys,
Briesen & Steele

(No Model.) 10 Sheets—Sheet 10.

J. A. GROEBLI.
EMBROIDERING MACHINE.

No. 328,935. Patented Oct. 27, 1885.

Witnesses:
John C. Tunbridge.
John M. Speer.

Inventor:
Joseph A. Groebli
by his attorneys
Briesen & Steele

UNITED STATES PATENT OFFICE.

JOSEPH ARNOLD GROEBLI, OF NEW YORK, N. Y., ASSIGNOR TO THE KUR-SHEEDT MANUFACTURING COMPANY, OF SAME PLACE.

EMBROIDERING-MACHINE.

SPECIFICATION forming part of Letters Patent No. 328,935, dated October 27, 1885.

Application filed August 19, 1884. Serial No. 140,929. (No model.)

*To all whom it may concern:*

Be it known that I, JOSEPH ARNOLD GROEBLI, a resident of the city of New York, in the county and State of New York, have invented an Improved Embroidering-Machine, of which the following is a full, clear, and exact description, reference being made to the accompanying drawings, in which—

Fig. 2 is a vertical cross-section of the same on the plane of the line $c\,c$, Fig. 1. Fig. 12 is an enlarged face view of the pawl P. Fig. 13 is an enlarged face view of the pawl V. Fig. 14 is a sectional view on the plane of the line $x\,x$, Fig. 10. Fig. 15 is a cross-section on the plane of the line $y\,y$, Fig. 14. Fig. 1$^a$, Sheet 1, is a detailed face view showing the carriage in contact with one of the elbow-levers $s$.

This invention relates to embroidering-machines of the class in which two reciprocating carriages are employed, one on each side of the vertically-suspended fabric, and one set of double-pointed needles that are moved by said carriages alternately.

The principal object of the invention is to make that part of the outward movement of each carriage which is performed in the immediate vicinity of the vertically-suspended fabric automatic, so that the attendant will only have to move the carriage by hand, if at all, after it has already been partly moved away from the fabric, together with the needles which it has grasped. Another object is to cause the carriages to grasp and release the needles automatically.

The invention consists in the new combination of parts and their new arrangement, that is hereinafter more fully described.

Figure 3:
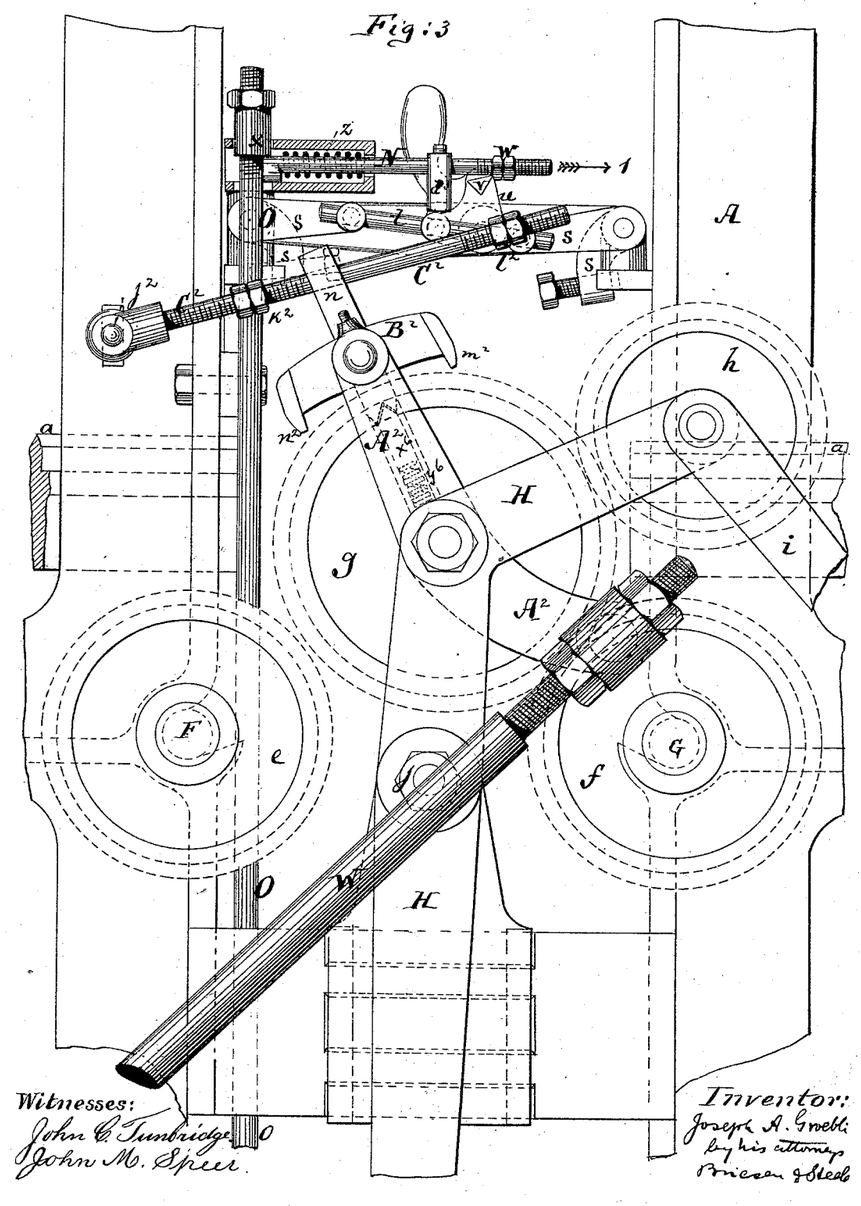
Fig. 3 is a side view, partly in section, on an enlarged scale of part of the mechanism used on the machine.
Figure 9:
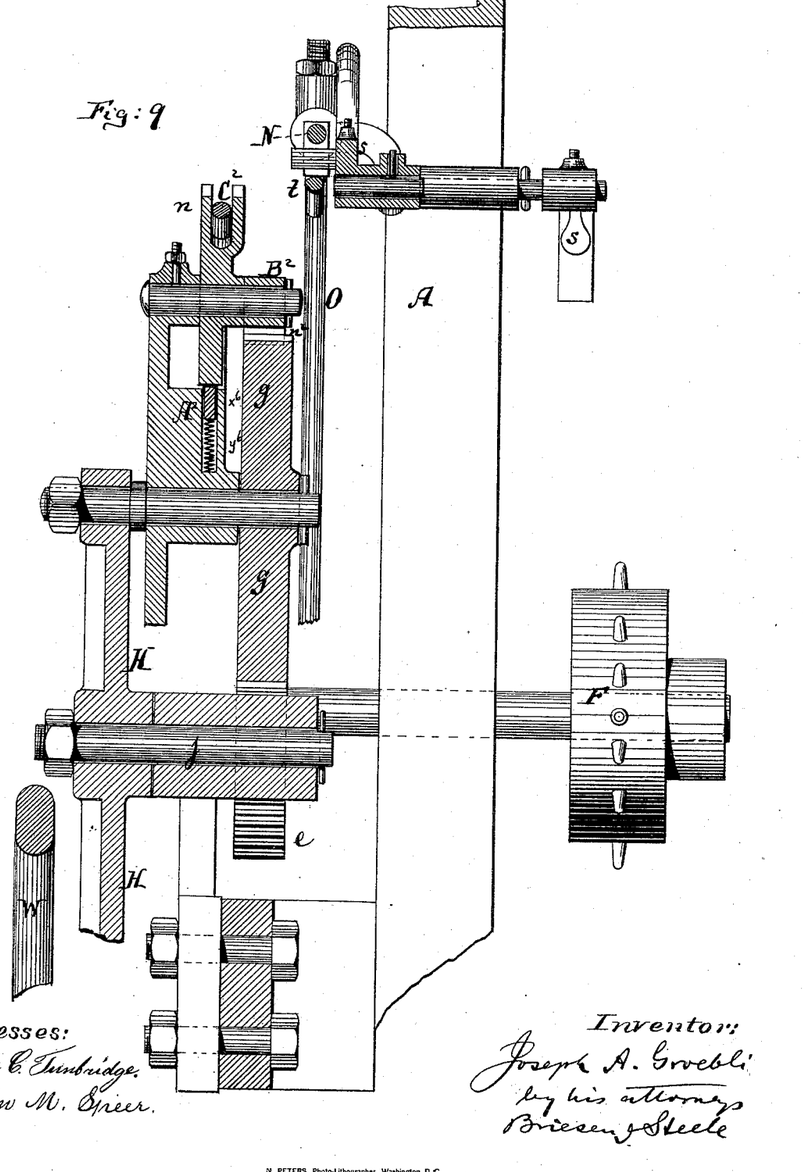
Fig. 9 is a vertical cross-section on an enlarged scale, the line $c\,k$, Fig. 8, indicating the plane of section.

In the drawings, the letter A represents the frame-work of the embroidering-machine. B and C are the two carriages traveling on rails $a\,a$, which are part of the framing A. Each of these carriages supports and carries with it one or more sets of needle-grips, $b$, the carriage B in Fig. 1 being shown to be provided with two such needle-grips $b$, one above and the other below the rails $a$. The fabric, which is vertically suspended in the usual manner of placing it in embroidering-machines, or in any suitable manner, between these carriages B and C, is indicated at D in Fig. 1. Each carriage is, by suitable lugs, $d$, united to a separate endless belt, E, which passes over two drums that are hung in the frame A, one of said drums at the outer end of each belt E not being shown in the drawings, the inner drums being indicated at F and G in Fig. 1—that is to say, there is a separate belt or set of belts, E, for each of the carriages. The belt E for the carriage C passes around the drum G, and the belt E for the carriage B around the drum F. Either carriage can be reciprocated on its track $a$ by turning the drum and moving the belt with which it is connected. The drums F and G, by preference, have teeth or prongs, as indicated in Figs. 2 and 9, so that they will properly take hold of their respective belts, which may be perforated to match said teeth. On the same shafts which carry these drums F and G are mounted toothed wheels $e$ and $f$, respectively, which are intended to mesh, one at a time, into a toothed wheel, $g$, that is always in gear with a pinion, $h$, which can be turned by a crank-handle, $i$. In the position of the parts shown in Fig. 1, by turning the crank-handle $i$ the wheel $g$ will be revolved, and that wheel being, in said position, in gear with the wheel $e$, the drum F will be turned and the carriage B moved in the desired direction; but the wheel $g$ revolves on a stud which is secured to a strong metal frame or bar, H, which, at $j$, is pivoted to the frame A of the machine, so that by vibrating this bar H on its pivot $j$ the toothed wheel $g$ can either be brought in gear with the pinion $e$, as in Fig. 1, or with the pinion $f$, as indicated in Fig. 3.

The true object of the mechanism hereinafter to be described is, first, to automatically throw the wheel $g$ into gear with the drum of the carriage that was stationary when the other carriage arrives next to the fabric; secondly, to automatically loosen the needle-grips on the carriage that arrives next the fabric on its way from a greater distance; and, thirdly, to start the carriage, which was stationary and which now takes the needles afresh, automatically on its travel away from the fabric. Thus the operator will have nothing to do but to turn the crank $i$ from time to time, so as to move a carriage that had already begun its outward movement away from the fabric until the threads are taut, and then back to the fabric until the needles shall have pierced the fabric and have been entered into the needle-grips of the other carriage, and then to move the other carriage in like manner.

Figure 7:
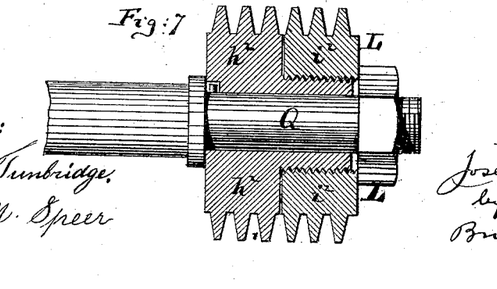
Fig. 7 is an enlarged central section of the small wheel used in my mechanism.
Figure 10:
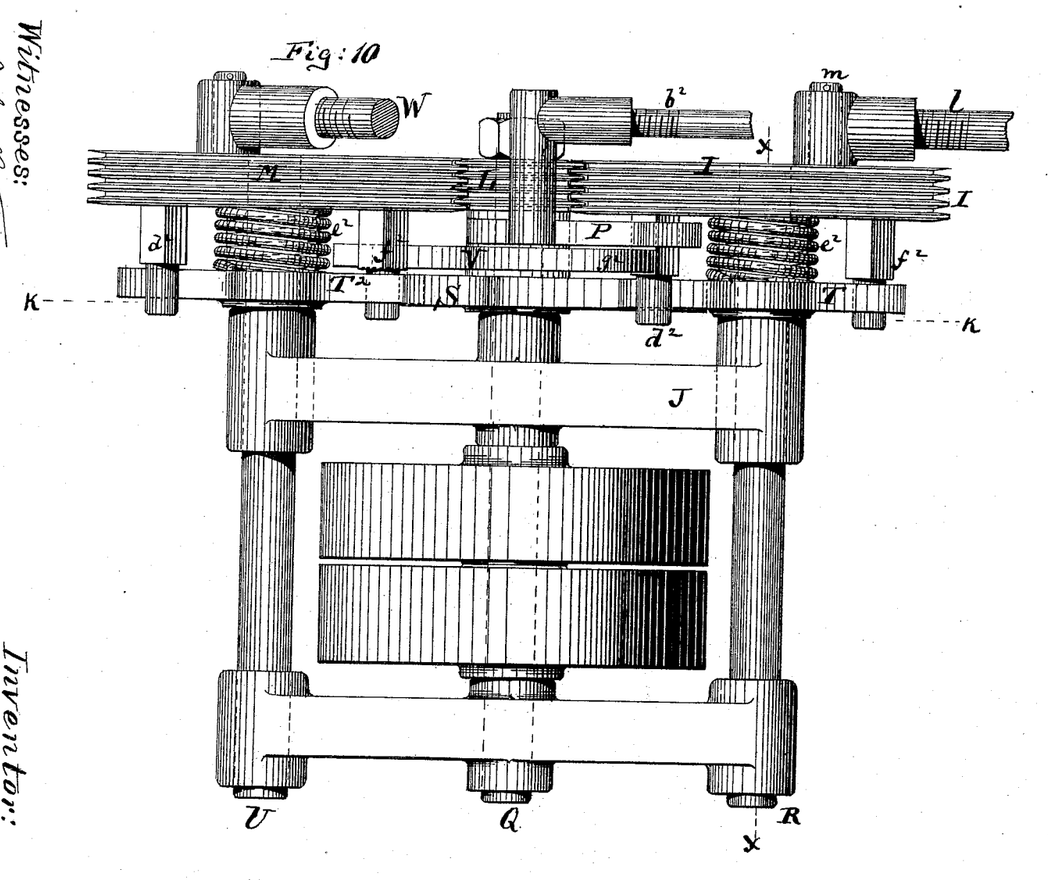
Fig. 10 is a top view of the driving mechanism connected with my improvement.

In order to perform the functions above stated automatically, it is in the first instance essential that the frame H should be swung on its pivot $j$ automatically from time to time. To do this the lower end of the said bar or frame H connects by a rod, $l$, with the crank-pin $m$ that is placed on a disk, I, which disk is mounted upon a shaft, R, that is hung in a framing, J. The disk I has two notches, $o\ p$, on opposite sides of its periphery, and is capable of being geared with a driving-wheel, L. This driving-wheel may either be a toothed wheel, in which case the wheel I would also be toothed to mesh into it, or preferably the driving-wheel L is grooved and ribbed, as shown in Figs. 7 and 10, to engage ribs and grooves along the edge of the disk I. Continuous motion is imparted to the wheel L by a belt and pulley connecting with the shaft Q, upon which said wheel L is mounted, and continuous rotary motion would thereby also be imparted to the disk I and to another similar disk, M, which is also mounted upon a shaft, U, which has its bearings in the framing J, and which is also in gear with the wheel L and which, has also two diametrically-opposite notches, $q\ r$, were it not for these notches, which, when they arrive next the wheel L, the motion of the disk being then arrested, prevent it from turning the disk so notched any farther until mechanism which I will now describe is brought into play. Each carriage B C, when it arrives next the fabric, strikes an elbow-lever, $s$, of which there are two, hung in the framing A. Each of the elbow-levers $s$ has one arm in the way of one of the carriages, while the other arm connects by a swivel-pin with a rod, $t$, the said rod $t$ connecting, as is clearly shown in Fig. 3, with both the said elbows $s$. This rod $t$, when both its ends are lifted so that it arrives in a substantially-horizontal position, will swing another elbow, $u$, so as to carry a prong which the latter carries, and which is marked $v$, against the adjustable shoulder $w$, which is preferably composed of two jam-nuts, on a sliding bolt, N, moving said bolt then in the direction of the arrow 1, Fig. 3. By so moving this bolt it is pulled away from under a shoulder, $x$, on an upright rod, O, and said rod O is allowed to be pulled down by a spring, $y$, (see Figs. 1 and 2,) or equivalent weight, the upper end of which spring bears against a fixed projection, $y^7$.

It is essential to a full understanding of the invention to observe that the rod O should be lowered by this spring $y$ only when both carriages B and C are in closest possible proximity to the fabric D, and therefore when both of them have actually swung the two elbow-levers $s\ s$ sufficiently to pull the bolt N away from under the shoulder $x$. While either one of the carriages is traveling, the bolt N will hold the rod O in the lifted position, and only when both are nearest the fabric will the rod O be allowed to be lowered. The bolt N is connected with the spring $z$, which will shoot it back into its place under the shoulder $x$ of the rod O as soon as the said rod O shall be lifted by mechanism which I will hereinafter describe. In order to enable the spring Z to shoot the bolt N back as soon as rod O is raised, and before either carriage begins to move, the bolt is made vertically movable, to disengage its shoulder $w$ from the prong $v$. To this end the bolt is slightly raised by the elbow $u$ and a projecting arm, $d^3$, to such a height as will allow the prong $v$ to pass under the shoulder $w$, whereupon the spring Z will throw the bolt N against the rod O again. The rod O connects at its lower part with an elbow-lever, $a^2$, which, by a rod, $b^2$, connects with a notched arm, P, which is loose on the shaft Q of the wheel L, and which is shown in a detailed view, Fig. 12. Before the rod $b^2$ was pushed to thus swing the notched arm P, said notched arm engaged over a pin, $d^2$, on the disk I, and thereby prevented said disk, which at this stage also presents its notch $o$ (see Fig. 11) to the wheel L, from being farther turned by frictional contact with the wheel L; but upon the rod $b^2$ being pushed, as stated, said notched arm P is lifted off the pin $d^2$, and thereupon a spring, $e^2$, which embraces the shaft R upon which the disk I is mounted, will slightly turn the disk I in the direction of the arrow shown on it in Fig. 11 far enough, in fact, to carry the notched part $o$ of said disk away from the wheel L, allowing the wheel L, which is constantly turning in the direction of the arrow shown on it in Fig. 11, to again take hold of the disk I and turn it half a revolution in its usual direction. While this half-revolution of this disk I is taking place—that is to say, until the notch $p$ becomes aligned with the driving-wheel L—a pin, $f^2$, which projects from the face of the disk I at a point that is diametrically opposite to the pin $d^2$, is brought against a star-wheel, S, that is hung loose on the shaft Q, and, striking said star-wheel, turns it partly around, thereby bringing another arm or prong of the star-wheel to bear upon the end of a lever, $T^2$, the center of which is hung loose upon the shaft U, upon which the disk M is mounted. The disk M corresponds in every way with the disk I, has also projecting pins $d^2 f^2$, notches $q r$, and has a spring, $e^2$, which connects at one end with the said disk M and at the other end with said lever $T^2$.

Figure 11:
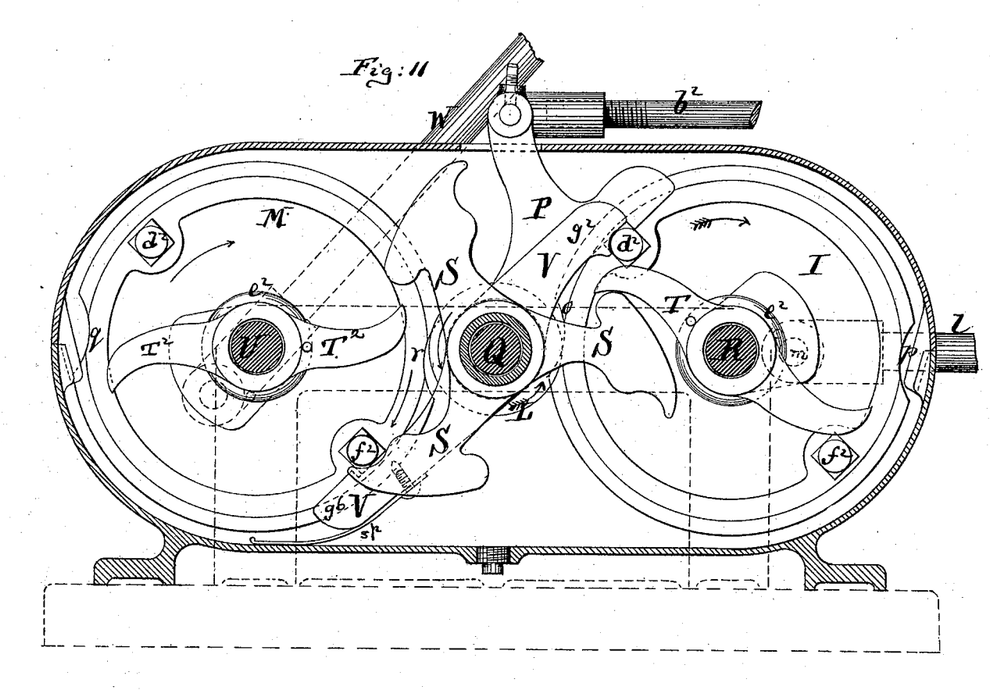
Fig. 11 is a vertical section taken on the line $k\,k$, Fig. 10, and on the same scale as Fig. 10.

At the time the star-wheel S strikes the lever $T^2$, which hangs on the shaft U, the disk M is stationary, having its notch $r$ near the wheel L and its pin $f^2$ caught by a notched bar, V, having upper arm, $g^2$, and lower arm, $g^6$, and which turns loose on the shaft Q, as shown in Fig. 11; and hence the star wheel S, striking the lever $T^2$ on shaft U, winds the spring $e^2$ on the shaft U sufficiently to strain it, so that when afterward the lower arm, $g^6$, of the notched bar V is moved away from the pin $f^2$, this said spring being wound, as stated, will start the disk M on its revolution sufficiently far to carry the notch $r$ away from the wheel L to enable the wheel L to engage with and positively turn the disk M during its next half-revolution.

But I will now resume the description of the disk I as it completes its first half-revolution—that is to say, the projecting pin $f^2$ of that disk, after having struck the star-wheel S and turned it, as stated, strikes the upper projection, $g^2$, of the notched bar V, pushing it aside so as to carry the lower arm, $g^6$, of said notched bar away from the pin $f^2$ of the disk M, and then, (the rod O being by this time again raised,) as the notched arm P is now in the position shown in Fig. 11, said notched arm P arrests the pin $f^2$ of the disk I at the same moment that the notch $p$ of the disk I arrives opposite the driving-wheel L, so that now the disk I is stopped and cannot again be moved until the rod O is again lowered by the arrival of both carriages B and C in their position nearest the fabric D. A spring, $s p$, (shown in Fig. 11,) connects one end of the notched arm V with the stationary frame, and serves to throw the said notched arm V against the pins $d^2$ and $f^2$ whenever said arm is not moved off said pins in manner described.

I have shown how the disk I makes one half-revolution and how it started the disk M on its half revolution by taking the restraining-arm V off the pin $f^2$ of the disk M and allowing the spring $e^2$, connected with disk M, to start the disk M into gear with the wheel L. In making its half-revolution the pin $d^2$ of the disk M will in its proper turn strike the star-wheel S and carry it finally into the position which is shown in Fig. 11, thereby causing it to swing the arm T, which is on the shaft R, into the position shown in Fig. 11, thus straining or winding the spring $e^2$, which encircles the shaft R sufficiently to cause it to start the disk I on its next half-revolution as soon as the crank P is moved to permit it. Thus I have shown that the wheel L, being constantly turned, will serve to impart half a revolution first to one and then to the other of the disks I M, whereupon said disks I M have their movements again arrested until the rod O is again lowered.

I have already stated that the wheel L may be an ordinary gear-wheel, but that I prefer it in the ribbed construction, which is shown in edge view, Fig. 10, and more clearly sectionally in Fig. 7. As to its detailed construction, it appears from Fig. 7 that said wheel L is made in two parts, $h^2 i^2$, each of which carries part of the ribbed circumference of said wheel. The two said parts are screwed together, as shown in Fig. 7, and enable me, when the ribs have become worn, to tighten them against the ribs of the disks I M by screwing the parts $h^2$ $i^2$ closer together.

Figure 1:
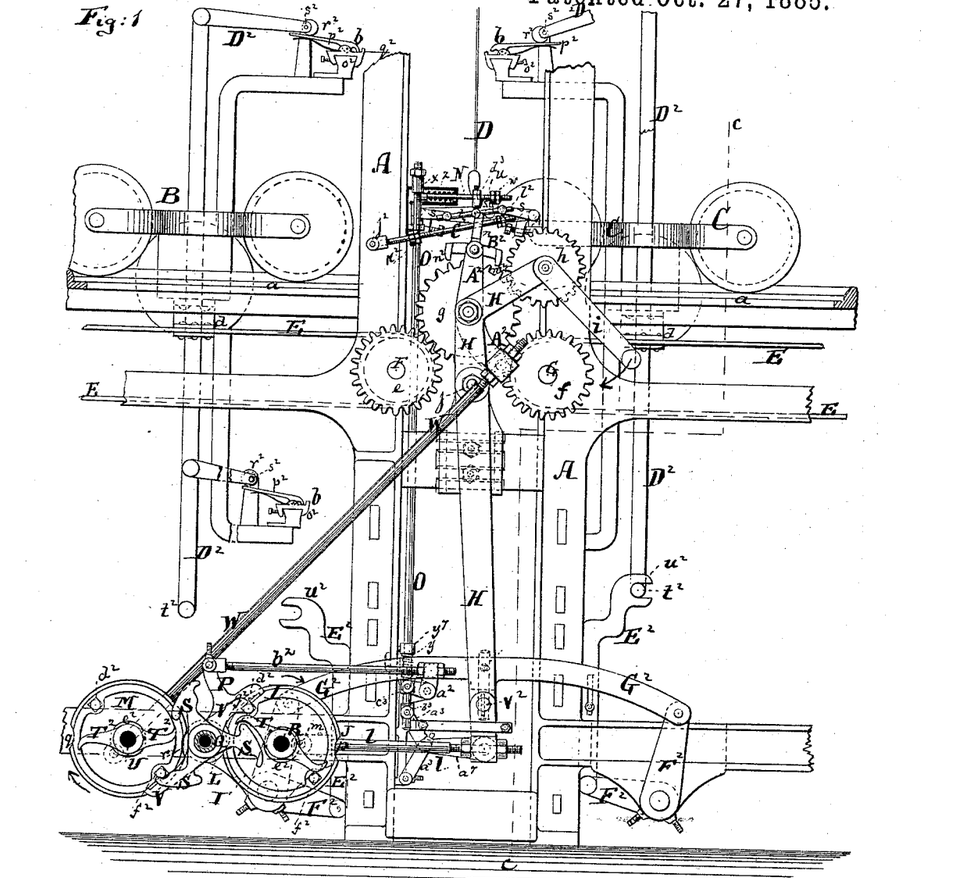
Figure 1 is a side view of the central portion of an embroidering-machine, showing my improvement.
Figure 1A:
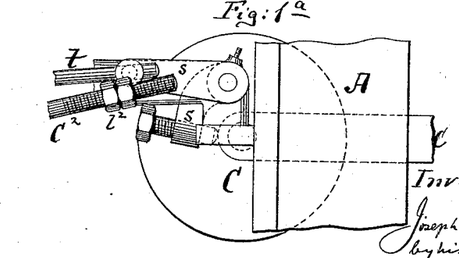

The half-revolution of the wheel I is made use of for moving the rod $l$ that engages with the frame or bar H back and forth, thereby oscillating said frame or bar H on its pivot $j$ and bringing its toothed wheel $g$ alternately into contact with the wheels $e$ and $f$—that is to say, when the wheel I is turned so as to bring the point of connection between it and the rod $l$ farthest from the shaft Q, as in Fig. 1, the frame H will be so swung as to bring the wheels $e$ and $g$ in gear; but when the wheel I is so turned as to bring its point of connection with the bar $l$ nearest to the shaft Q, then the bar or frame H will be so swung as to bring the wheels $f$ and $g$ in gear with each other, as indicated in Fig. 3. Now, of course, whichever of the wheels, $e$ or $f$, is in gear the carriage connected therewith can be moved while the other carriage will remain stationary.

Figure 8:
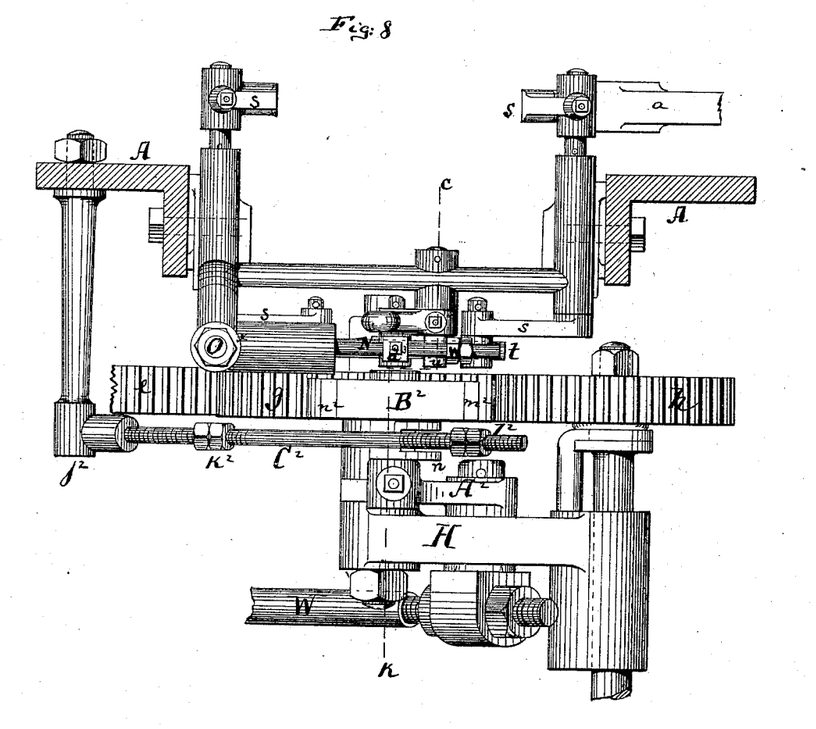
Fig. 8 is an enlarged plan view of part of my mechanism, the uprights of the frame into which it is fitted being shown in section.

The movement of the bar or frame H on its pivot $j$ is also utilized for lifting the rod O into re-engagement with the bolt N. This is done by toggle-levers $a^3$, which connect at the lower end with the frame A at the middle by a link, $a^7$, with the vibrating frame H, and on top with a sleeve, $b^3$, which encircles the rod O loosely beneath a shoulder, $c^3$, thereon. Whenever the rod H is swung from one position to another, it elongates the toggle and lifts the rod O, and then contracts the toggle again. As soon as the rod O is lifted, the bolt N is by the spring Z shot under the shoulder X to hold the rod O in its raised position. The half-revolution of the other disk M is made use of for starting the carriage which is to move automatically on its travel away from the fabric D. To this end the disk M is connected by a wrist-pin with a rod, W, which at its upper end connects with a lever, $A^2$, that is hung loose on the axis of the wheel $g$, and that carries at its upper part an anchor, $B^2$, which is pivoted thereto, and which is forked at the upper end of its shank $n$, as indicated in Figs. 8 and 9, and straddles a rod, $C^2$, which is pivoted at $j^2$ to the frame A of the machine, and which has two adjustable stops, $k^2$ and $l^2$. These stops are shown as nuts in Fig. 3 and in other figures of the drawings.

Figure 4:
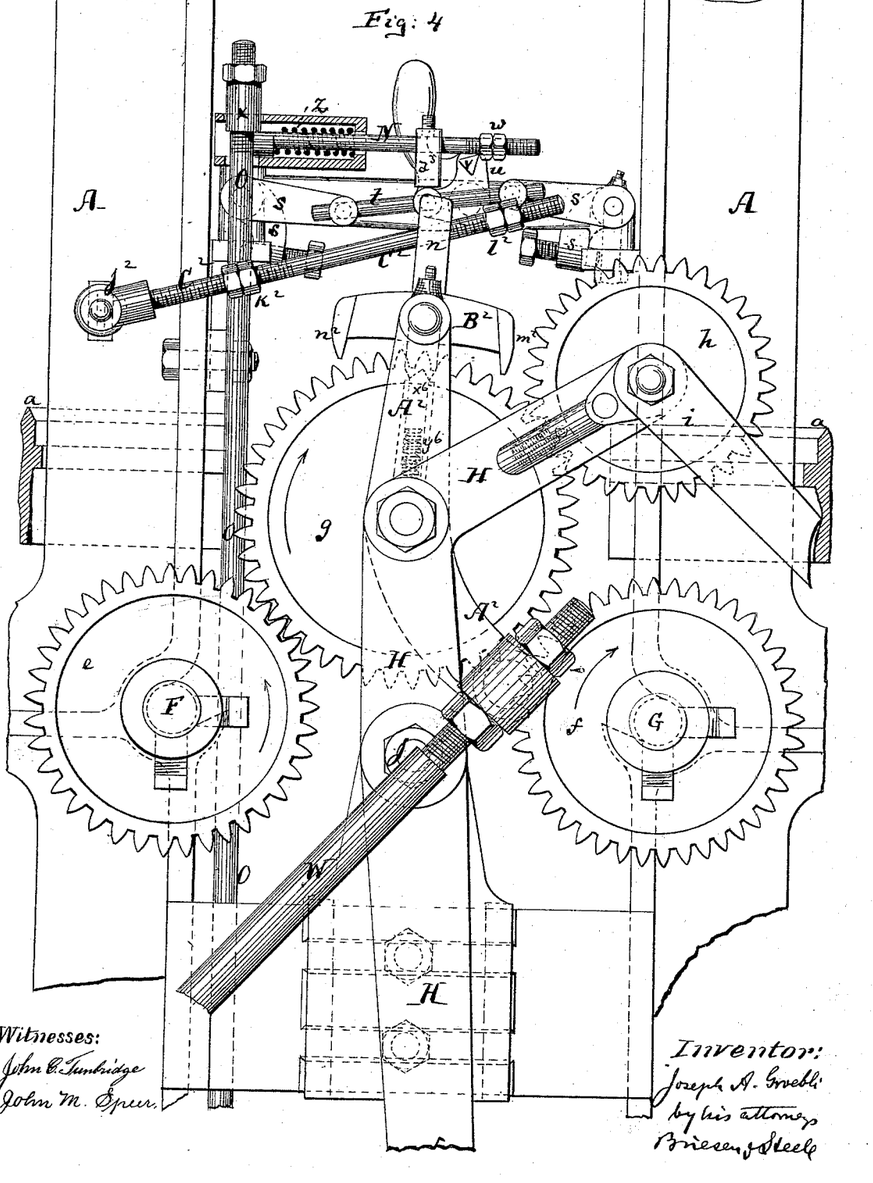
Fig. 4 is a similar enlarged side view of the same parts, showing them in different positions.

The anchor is held in its normal position, both claws out of contact with the wheel $g$, by a small slide, $x^6$, pressed by a spring, $y^6$, into a notch on the lower arm of the anchor. (See Fig. 4.)

Figure 5:
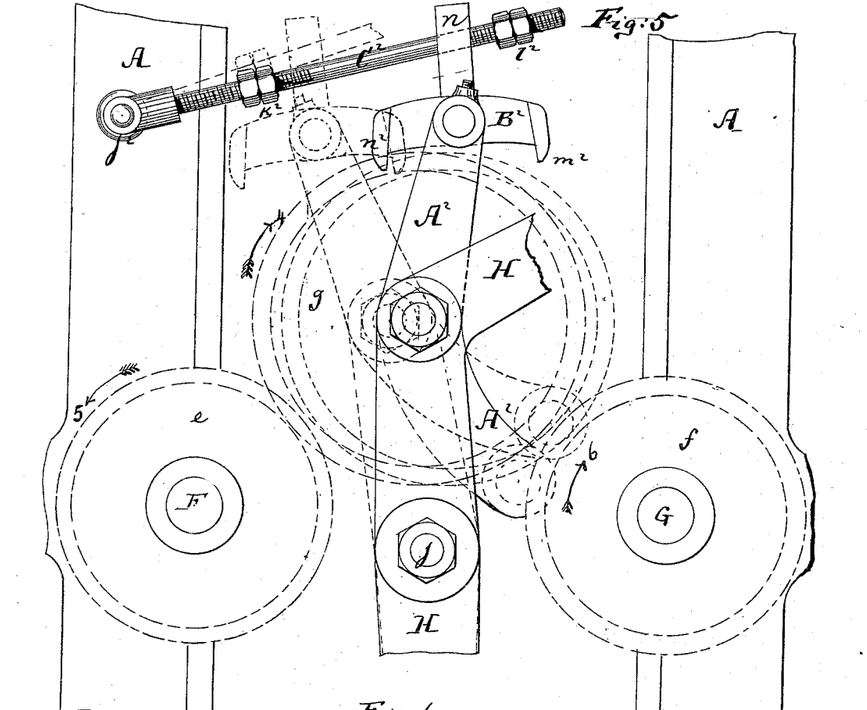
Fig. 5 is a similar enlarged side view of some of said parts, showing them in still another position.

When the disk I is turned to bring the wheels $e$ and $g$ in gear, the frame or bar H has its upper end swung to the left, and thereby carries the anchor-bearing lever $A^2$, whose pivot lies in the frame or bar H, to the left also, until the forked shank $n$ of the anchor strikes the stop $k^2$, whereupon, by contact with said stop, the anchor is tilted on its own pivot to bring its claw $m^2$ between two of the teeth of the wheel $g$, substantially as indicated by dotted lines in Fig. 5. The disk I then stops, and the disk M begins its half-revolution, pulling during such motion on the rod W and swinging the lever $A^2$, and with it the anchor $B^2$, to the right, thereby turning the wheel $g$ in the direction of the arrow 4, Fig. 5. The wheel $g$ being at this time in gear with the wheel $e$ causes, by such partial turning, said wheel $e$ to be turned in the direction of the arrow 5, which is shown in Fig. 5, and thereby the carriage B is automatically started on its outward movement. The operator then takes hold of the crank-handle $i$ and revolves the wheels $h$, $g$, and $e$, so as to first move the carriage B far enough outward to draw the threads taut, and then reverses the rotation so as to bring the carriage B close to the fabric D again. Fig. 1 shows the position of all the parts after the outward movement of the carriage B has been begun, and after the claw $m^2$ has turned the wheel $g$ automatically. As the carriage B now returns to the fabric D its frame strikes the elbow $s$ nearest it, and raises thereby the rod $t$ into the horizontal position, so as thereby to draw the bolt N and drop the rod O and start the disks I M on another half-revolution. The disk I in now being turned will first swing the frame or bar H with its upper end to the right, so as to carry the wheel $g$ into gear with the wheel $f$, and at the same time will also carry the lever $A^2$ to the right until the shank $n$ of the anchor $B^2$ strikes the stop $l^2$, and throws the claw $n^2$ in engagement with the wheel $g$, as indicated by full lines in Fig. 5. Now, the disk M, beginning to turn, pushes the rod W and throws the lever $A^2$ from the position shown by full lines in Fig. 5 into the position shown by full lines in Fig. 3, and while this is being done the anchor turns the wheel $g$ in the direction opposite to that shown by the arrow 4 in Fig. 5, and thereby turns the wheel $f$ in the direction of the arrow 6 in Fig. 5, thus starting the carriage C automatically on its outward motion. Whenever the anchor $B^2$ has turned the wheel $g$ in the manner stated, it is, by its connection with the rod $C^2$, swung on its pivot sufficiently to disengage the claw that turned the wheel from the latter. Thus in Fig. 3 it is shown so disengaged, and thus the apparatus continues to operate in the manner already described.

Figure 6:
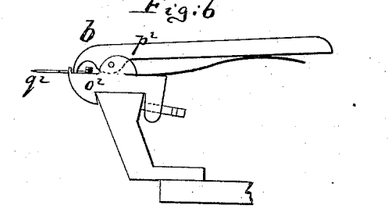
Fig. 6 is an enlarged side view of the needle-grip.

Each carriage B C is provided, as has already been stated, with a set of needle-holders, $b$, which are of the usual construction. Fig. 6 shows one of these needle-holders in an enlarged view. It is composed of a bed, $o^2$, and of a spring-lever, $p^2$, the latter holding the needle $q^2$. Upon this spring-lever bears an eccentric, $r^2$, which is mounted upon the pivot $s^2$ of a jointed lever, $D^2$. The pivot $s^2$ has its bearings in the bracket that is fixed to the carriage, as is indicated on the left-hand side of Fig. 1. The lower end of the vertical part of the jointed lever $D^2$ has a projecting pin, $t^2$, which, when the carriage arrives next to the fabric, enters a fork, $u^2$, on a vertical slide, $E^2$, which slide now is moved up to push the jointed lever $D^2$ upward, and thereby turn the pivot $s^2$ and the eccentrics $r^2$, so that the latter bear on the levers $p^2$ and opens the needle-holding device, as is indicated on the right-hand side of Fig. 1.

It remains to show how the slides $E^2$ are raised and lowered. To this end each of the slides $E^2$ is at its lower end joined to an elbow-lever, $F^2$, which is pivoted in the frame A of the machine. The two elbow-levers $F^2$ are at their upper ends connected to a yoke, $G^2$, (see Fig. 1,) which at $v^2$ is connected to the frame or bar H. When this frame or bar has its lower end swung to the right, as in Fig. 1, the elbow $F^2$ beneath the carriage C is vibrated on its pivot, so as to raise its slide $E^2$ and the jointed lever $D^2$, connected therewith, thus disengaging the needles that were held in the carriage C. It will be perceived that this is done at the time the frame H is swung, so as to throw the wheels $g$ and $e$ into gear. At the same time the other slide $E^2$ is lowered by having its elbow $F^2$ swung accordingly, and the needle-holders on the carriage B are tightened to enable them to take hold of the needles which are being released from the carriage C. When, afterward, the bar or frame H is swung with its lower end to the left, the slide $E^2$ beneath the carriage C is lowered and that beneath the carriage B raised, so as to disengage the needles from the carriage B and cause them to be held by the carriage C.

I claim—

1. In an embroidering-machine, the combination of the carriages B and C with the pinions $e$ and $f$, toothed wheel $g$, belts E E, and automatic mechanism composed of the bar H, rod $l$, crank-pin $m$, disk I, and wheel L, substantially as described, for alternately throwing the wheel $g$ into gear with the wheels $e$ and $f$, as specified.

2. The combination of the pivoted bar H, with means, substantially as described, for swinging it on its pivot, with the toothed wheels $g$ $e$ $f$, drums F G, belts E E, carriages B C, lever $A^2$, anchor $B^2$, stops $k^2$ and $l^2$, and with the rod W, for swinging the lever $A^2$ on its pivot and causing the anchor to turn the wheel $g$, as specified.

3. The combination of the carriages B and C and means, substantially as described, for moving them on their supporting-rails with the elbow-levers $s$ $s$, rod $t$, elbow $u$, bolt N, and vertical slide O, all arranged to disengage the bolt from the vertical slide O when the carriages B and C are in the position of closest proximity to each other, substantially as specified.

4. The combination of the driving-wheel L with the notched disks I M, having pins $d^2 f^2$, notched arm P, notched arm V, star-wheel S, levers T $T^2$, and springs $e^2$ $s$ $p$, rod W, and the connections thereof with the needle-carriages B C, and with means, substantially as described, for swinging the arm P at intervals, substantially as specified.

5. The ribbed and grooved driving-wheel L, made in two sections, $h^2$ $i^2$, which are screwed together for combination with the grooved and ribbed disks I M, having pins $d^2 f^2$, and notched arms P and V, star-wheel S, and lever T, substantially as specified.

6. The combination of the disk I and means, substantially as described, for imparting to it intermittent rotary motion with the vibrating frame H, to which it is joined, toothed wheels $g$ $e$ $f$, carriages B C, and with the disk M, mechanism, substantially as described, for imparting intermittent rotary motion thereto, rod W, lever $A^2$, and anchor $B^2$, all arranged, substantially as described, for throwing the wheel $g$ alternately into gear with the wheels $e f$ and thereupon automatically turning said wheel $g$ by means of the anchor, as specified.

7. The combination of the carriages B C with the vertical slide O and means, substantially as described, for lowering it when the two carriages are in the position of closest proximity, elbow $a^2$, notched arm P, notched disk I, and mechanism for turning the latter notched arm, frame H, wheels $g$ $e$ $f$, disk M, and mechanism for turning the latter, rod W, lever $A^2$, and anchor $B^2$, substantially as specified.

8. The combination of the carriages B C and their needle-holders $o^2$ $p^2$, having grips $b$, with the eccentrics $r^2$, placed above said grips, jointed levers $D^2$, slides $E^2$, bar H, yoke $G^2$, elbows $F^2$, and means, substantially as described, for moving said bar H, as set forth.

9. The combination of the two carriages B C of an embroidering-machine with the rod $l$ and bar H, substantially as described, for alternately throwing them in gear with the driving-wheel $g$ when they are in position of closest proximity, with the lever $D^2$, slide $E^2$, elbow $F^2$, yoke $G^2$, bar H, for automatically disengaging the needles from the carriage which last arrived near the fabric, and with rod W, lever $A^2$, and anchor $B^2$, substantially as described, for automatically starting the carriage which has longest been at rest on its outward motion, as specified.

10. The carriages B C of an embroidering-machine, combined with automatic mechanism composed of the toothed wheels $e$ $f$ $g$, bar H, rod $l$, crank-disk I, and driving-wheel L, for moving one carriage outwardly as soon as both have reached the position of closest proximity to the fabric D, as set forth.

11. The combination of the pivoted bar H and means, substantially as described, for vibrating it with the toggle $a^3$, sliding rod $o$, spring $y$, and bolt N, and with mechanism, substantially as described, for moving said bolt, as set forth.

12. The disk I, having pins $d^2$ $f^2$, in combination with the spring $e^2$, lever T, which is loose on the shaft, star-wheel S, and notched arms P and V, needle-carriages B C, rods $l$ H, and pinions $e f g$, substantially as and for the purpose specified.

13. The disk I, having studs $d^2$ and $f^2$, in combination with stops, substantially as described, for arresting said disk after every partial rotation by means of said studs, and with the lever T, wheel S, and arms P and V, needle-carriages B C, rods $l$ H, and pinions $e f g$, as set forth.

14. The combination of the carriages B C with the levers $s$ $s$, which are connected, substantially as described, with the rod $t$, and mechanism, as described, for reversing the carriages, substantially as herein shown and described.

15. The carriages B C of an embroidering-machine, combined with the notched arm P and with the mechanism, substantially as described, for moving said notched arm when the carriages are in closest proximity to one another, with mechanism connecting said notched arm with the carriages, as set forth.

16. The combination of the slide O and mechanism for raising and lowering the same, substantially as described, with the bolt N, elbow-lever $u$, spring $z$, and needle-carriages B C, all arranged to release the bolt N from said rod O by the motion of the elbow $u$, and by the continued motion of said elbow to cause said bolt to move back toward said rod, as set forth.

JOSEPH ARNOLD GROEBLI.

Witnesses:
GUSTAV SCHNEPPÉ.
CHARLES G. M. THOMAS.